March 1, 1949.   E. J. CARTER   2,463,244
METHOD OF MAKING ADHESIVE TAPE
Filed Aug. 7, 1947
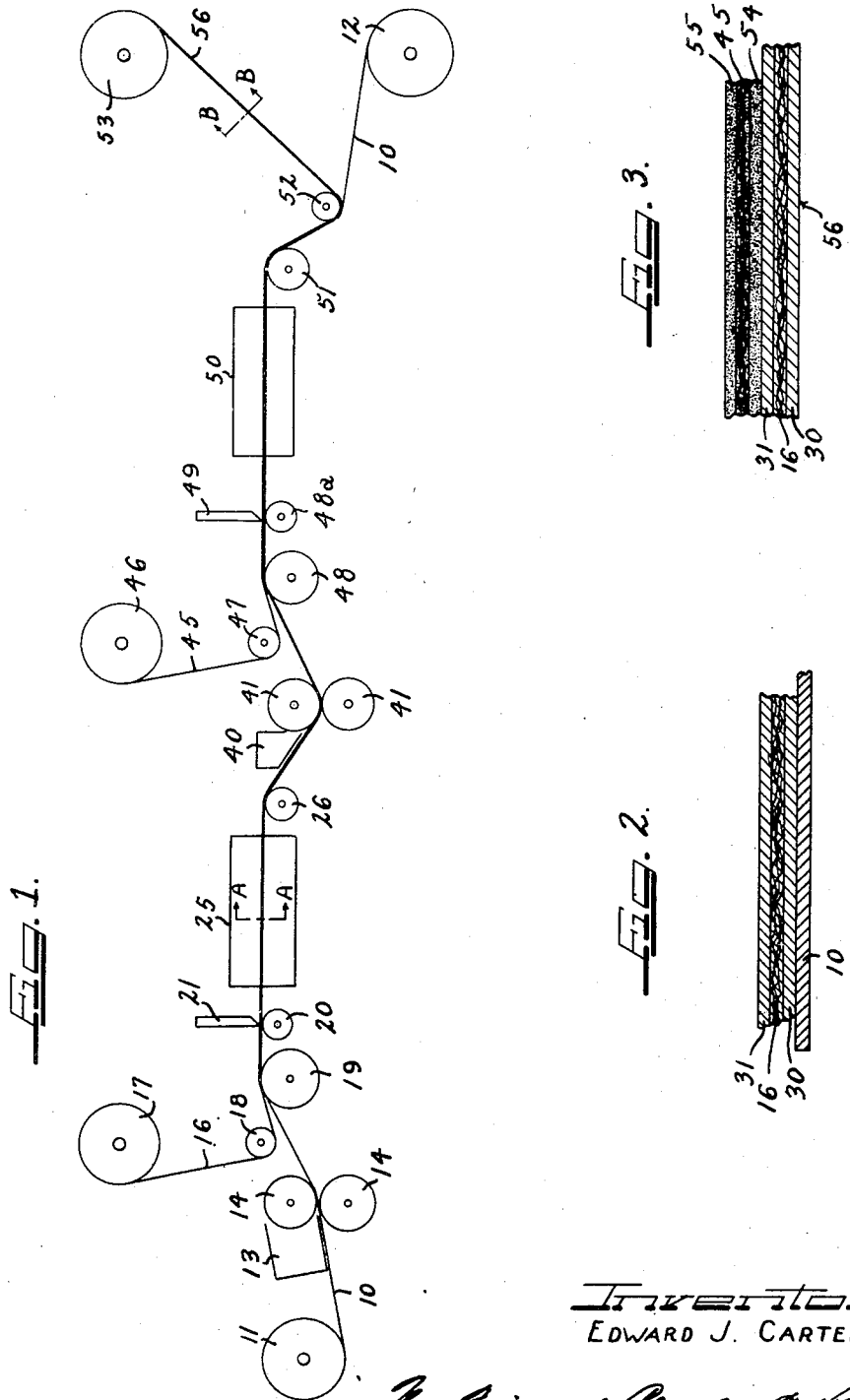
Inventor
EDWARD J. CARTER Patented Mar. 1, 1949

2,463,244

UNITED STATES PATENT OFFICE 2,463,244

METHOD OF MAKING ADHESIVE TAPE

Edward John Carter, New York, N. Y., assignor to William M. Scholl, Chicago, Ill.

Application August 7, 1947, Serial No. 767,163

3 Claims. (Cl. 154—97.5)

This invention relates to a method for making more or less transparent pressure-sensitive sheet material including a resinous film reinforced with a network of felted fibrous material and coated with a layer of pressure-sensitive adhesive likewise reinforced with a layer of felted fibrous material embedded therein.

This application is a continuation-in-part of my earlier filed, copending application entitled "Adhesive tape," Serial No. 635,946, filed in the United States Patent Office on December 19, 1945.

According to the present invention, sheet material of the nature indicated is prepared by distributing a solution of a film-forming resin over a casting web, superimposing a paper web over the layer of resin solution, compressing said layer of resin solution between the paper web and the casting web to force the solution upwardly through the paper web so as to impregnate the latter and to form layers of solution on both sides of the paper web, evaporating the solvent from the resin solution to form a resin film having the paper embedded therein, spreading a solution of a pressure-sensitive adhesive over one side of the fiber reinforced resin film, superimposing a paper web over the adhesive solution, compressing the adhesive solution between the resin film and the paper web to force the resin solution upwardly through the paper web so as to impregnate the same and to form layers of adhesive solution on both sides of the paper web, evaporating the solvent from the resin solution to form a layer of pressure-sensitive adhesive on the resin film with the paper embedded in said adhesive layer, and stripping the casting web from the resin film.

It is therefore an important object of the present invention to provide methods for the preparation of pressure-sensitive sheet material of the nature indicated and having a pressure-sensitive material superimposed upon the resin film, both the pressure-sensitive material and the resin film being reinforced by a network of felted fibrous material.

Other and further objects of the present invention will become apparent from the following description and appended claims.

In preparing the adhesive sheet material of the present invention, I may utilize solutions in any appropriate solvents of the well known film-forming resins, in particular, cellulose acetate, cellulose acetate butyrate, ethyl cellulose, and other cellulose ethers, nylons (super-polyamides), polyvinyl alcohol, polyvinyl alcohol acetate, polyvinyl chloride, polyvinyl chloride acetate, polyvinyl butyral, polystyrene or polymerized methyl methacrylate. These resin solutions are plasticized as may be necessary or desirable to provide flexibility in the films formed therefrom.

Specific film-forming solutions may include 38 parts by weight cellulose acetate, 12 parts by weight diethyl phthalate, and 50 parts by weight acetone.

By way of example, the drawing shows schematically a method for preparing sheet material according to the present invention. More particularly, Figure 1 is a side elevation of apparatus for making sheet material according to the present invention;

Figure 2 is a vertical cross-sectional view taken along the line A—A of Figure 1 through the product in an intermediate stage of production; and Figure 3 is a vertical cross-sectional view taken along the line B—B of Figure 1 through the finished product.

In Figure 1, the reference numeral 10 indicates a casting web extending throughout the apparatus of Figure 1, being unwound from a roll 11 at the left-hand end of the apparatus and wound up on another roll 12 at the right-hand end of the apparatus. This casting web is suitably made up of pyroxylin coated textile material. The pyroxylin coating serves to facilitate stripping of the finished product from the casting web.

The casting web 10 is continuously advanced through the apparatus of Figure 1 from left to right. After the casting web 10 has been unrolled, a layer of film-forming solution is deposited thereon, as from a box, hopper, or other distributing means 13, and the web with its deposit of film-forming solution passes between rollers 14 that serve to distribute the film-forming solution over the top of the casting web. Next, a web of bibulous or porous paper 16 continuously unwound from a roller 17 passes under the roller 18 into tensioning contact with the resin solution layer on the casting web. More particularly, the paper web together with the resin solution contacted therewith and the casting web pass over a roller 19 having its top higher than the bottom of the roller 18 so that the resin solution is compressed between the paper web 16 and the casting web 10 whereby the resin solution is forced upwardly through the paper web, displacing air therein, and forming layers of solution on both sides of the paper web. The resulting laminate next passes between the roller 20 and an opposed doctor knife 21 and into a dryer 25 where the solvent is evaporated off from the resin solution to form a structure shown in greater detail in Figure 2 as including the casting web 10, a layer of resin 30, the paper web 16 impregnated with said resin and an uppermost layer of resin 31.

From the dryer 25, the laminate passes over the roller 26 and receives on its upper surface a deposit of a solution of a pressure-sensitive adhesive from an appropriate box, hopper or distributor 40. Next, the laminate with its deposit passes through opposed rollers 41 that distribute the solution of pressure-sensitive adhesive evenly over the top of the resinous film. A web 45 of porous or bibulous paper continuously unwound from a roller 46 and passing under another roller 47 is then contacted with a layer of pressure-sensitive adhesive solution. The lamination is effected when the webs pass over a roller 48 having its top disposed above the bottom of the roller 47 with the result that the paper web 45 is tensioned and the layer of pressure-sensitive adhesive solution is compressed between the paper web 45 and the paper reinforced resinous film to force adhesive solution up through the paper web 45, impregnating the latter and establishing layers of adhesive solution on both sides of the paper. Then excess adhesive solution is scraped off from the top of the web by passing the laminate between a roller 48a and a doctor knife 49. The laminate is now ready for passage through a dryer 50 in which the solvent is evaporated off from the adhesive solution. The product so obtained passes over a roller 51 and under a roller 52 where the casting web 10 is stripped off from the finished product (indicated by reference numeral 56) for winding up on the roller 12. The finished product 56 is wound up on the roller 53.

The application and drying of the adhesive while the fiber-reinforced backing still is held under tension on the casting strip helps to prevent crinkling, curling or other distortion of the backing due to evaporation of solvent from the adhesive.

The structure of the finished product is shown in Figure 3 as including the paper web 16 impregnated with resin that also forms a lower layer 30 and an upper layer 31 on the two sides of the paper web together with the paper web 45 impregnated with a pressure-sensitive adhesive that also forms a lower layer 54 bonded to the resin layer 31 and an upper layer 55 on top of the paper.

To make up a layer of pressure-sensitive adhesive, I may employ any appropriate solution of any one of the well known pressure-sensitive adhesives including, for example, rubber combined with resinous products such as rosin. By way of example, I may employ a 30% solution in an appropriate solvent of a composition including 25 to 35 parts of "Vistanex B–100", 7½ to 12½ parts "Vistanex B–12," from 15 to 25 parts "Amber EX" (Factice) and from 25 to 35 parts by weight of "Vistac No. 1".

The sheet, strip or tape material prepared as described hereinabove is distinguished by transparency, flexibility, resistance against tearing and resistance against separation of adhesive from the resin film. When the resin and adhesive are properly selected, the sheet or tape material may be rolled up upon itself without any danger of the adhesive layer adhering to the underside of the resin film with consequent splitting off of adhesive from resin on unrolling.

If desired, I can substitute for the laminate 10, 30, 16, 31 shown in Figure 2, a layer of paper, regenerated cellulose, a resin film, or the like sheet material, coat the substituted sheet material with a liquid adhesive, deposit a web of bibulous or porous paper on the adhesive, and compress the adhesive between the substituted sheet material and the porous or bibulous paper web, as disclosed hereinabove, to force the adhesive upwardly through the paper web and to form an adhesive sheet structure including a sheet coated with an adhesive-reinforced with a felted fibrous network.

It should be understood that many details of procedure, composition and structure may be varied within a wide range without departing from the principles of this invention, and it is, therefore, not my purpose to limit the patent granted on this application otherwise than necessitated by the scope of the appended claims.

I claim as my invention:

1. A method of preparing a pressure-sensitive adhesive sheet material which includes spreading a solution of a film-forming resin over a casting surface, superimposing a layer of porous paper on said layer of film-forming solution, compressing said layer of film-forming solution between said paper and said casting web to force said film-forming solution up through said paper web and to establish a layer of resin solution on each side of said paper web, evaporating the solvent from said film-forming solution to form a resin film having said paper embedded therein, distributing a solution of a pressure-sensitive adhesive over said resin film, superimposing a second paper web over said layer of pressure-sensitive solution, compressing said layer of pressure-sensitive adhesive solution between said film and said second paper web to force said adhesive solution up through said paper web and to establish a layer of adhesive solution on each side of said second paper web, evaporating off the solvent from said solution of adhesive to form a film of pressure-sensitive adhesive having said second paper web embedded therein and bonded to said resin film, and stripping said casting web from said resin film.

2. A method of preparing an adhesive sheet structure which comprises providing a sheet material adapted for use as a base in said structure, distributing a liquid adhesive over said sheet material, superimposing over said adhesive a porous paper web permeable with respect to said adhesive, and compressing said adhesive between said sheet material and said paper web to force said adhesive up through said paper web and to establish a layer of adhesive on each side of said paper web.

3. A method of preparing a pressure-sensitive adhesive sheet material which includes spreading a solution of a film-forming resin over a casting surface, superimposing a layer of porous paper on said layer of film-forming solution, compressing said layer of film-forming solution between said paper and said casting web to force said film-forming solution up through said paper web and to establish a layer of resin solution on each side of said paper web, evaporating the solvent from said film-forming solution to form a resin film having said paper embedded therein, distributing a solution of a pressure-sensitive adhesive over said resin film, superimposing a second paper web over said layer of pressure-sensitive solution compressing said layer of pressure-sensitive adhesive solution between said film and said second paper web to force said adhesive solution up through said paper web and to establish a layer of adhesive solution on each side of said second paper web, evaporating off the solvent from said solution of adhesive to form a film of pressure-sensitive adhesive having said second paper web embedded therein and bonded to said resin film, and stripping said casting web from said resin film, said resin film being tensioned lengthwise throughout said process up to and including said stripping step.

EDWARD JOHN CARTER.

REFERENCES CITED

The following references are of record in the file of this patent:

UNITED STATES PATENTS

| Number | Name | Date |
| --- | --- | --- |
| 1,690,179 | Sadtler | Nov. 6, 1928 |
| 2,206,899 | Kellgren | July 9, 1940 |
| 2,350,840 | Tagliabue | June 6, 1944 |
| 2,364,001 | Schieman | Nov. 28, 1944 |
| 2,395,668 | Kellgren et al. | Feb. 26, 1946 |